United States Patent [19]

Saito et al.

[11] Patent Number: 4,990,570
[45] Date of Patent: Feb. 5, 1991

[54] CURABLE RUBBER COMPOSITION

[75] Inventors: Yoshiomi Saito, Yotukaido; Akio Fujino; Atsumi Ikeda, both of Kawasaki, all of Japan

[73] Assignee: Nippon Zeon Co., Ltd., Tokyo, Japan

[21] Appl. No.: 364,339

[22] Filed: Jun. 8, 1989

[30] Foreign Application Priority Data

Jun. 9, 1988 [JP] Japan .................................. 63-142067

[51] Int. Cl.$^5$ ........................ C08L 9/02; C08L 51/04; C08K 5/09
[52] U.S. Cl. .................................... 525/254; 525/274; 525/264; 524/534
[58] Field of Search ....................... 525/263, 264, 254; 524/534

[56] References Cited

U.S. PATENT DOCUMENTS

| | | | |
|---|---|---|---|
| 3,344,105 | 9/1967 | McDonel et al. | 525/193 |
| 4,560,729 | 12/1985 | Watanabe et al. | 525/233 |
| 4,576,992 | 3/1986 | Buding et al. | 525/233 |
| 4,692,497 | 7/1987 | Gendreau et al. | 525/263 |
| 4,713,409 | 12/1987 | Hayes et al. | 525/193 |
| 4,843,128 | 6/1989 | Cesare | 525/193 |

OTHER PUBLICATIONS

Materials and Compounding Ingredients for Rubber, pp. 231, 232, 236, 255, 256-5/75-Bill Communications Inc., Consise Chen. & Tech. Dictionary, p. 939-5/-75-Chen. Pub. Co. Inc.

Primary Examiner—Carman J. Seccuro
Attorney, Agent, or Firm—Armstrong, Nikaido, Marmelstein, Kubovcik and Murray

[57] ABSTRACT

Disclosed is a curable rubber composition comprising (a) 100 parts by weight of an ethylenically unsaturated nitrile/conjugated diene type highly saturated rubber in which the content of conjugated diene units in the polymer chain is not higher than 30% by weight, (b) 10 to 100 parts by weight of zinc salt of methacrylic acid, (c) 5 to 50 parts by weight of silicic anhydride and (d) 0.2 to 10 parts by weight of an organic peroxide. The curable rubber composition provides a cured product having an excellent strength, abrasion resistance, and compression set.

9 Claims, 3 Drawing Sheets

4,990,570

CURABLE RUBBER COMPOSITION

BACKGROUND OF THE INVENTION

(1) Field of the Invention

The present invention relates to a curable rubber composition. More particularly, the present invention relates to a curable rubber composition having an excellent strength, abrasion resistance, and resistance to compression set.

(2) Description of the Related Art

The incorporation of zinc dimethacrylate and/or basic zinc methacrylate in a rubber is well known. For example, British Patent No. 1,091,818 teaches that a rubber having an excellent strength can be obtained by incorporating a metal salt of dimethacrylic acid and an organic peroxide in an ethylene/propylene rubber, and crosslinking the composition; British Patent No. 159,477 discloses a golf ball having a core composed of a rubber obtained by mixing basic zinc methacrylate (zinc oxide/methacrylic acid molar ratio=1/1 to 1.5/1) into a polybutadiene rubber and curing the rubber with a radical generator; Japanese Unexamined Patent Publication No.59-149938 teaches that a product obtained by incorporating zinc dimethacrylate particles having a surface area of about 3.7 to about 5.4 $m^2/g$ and carbon black, silica or clay, and curing the composition with a peroxide curing agent has an excellent strength; and Japanese Unexamined Patent Publication No. 52-121653 teaches that a composition having an excellent abrasion resistance is obtained by mixing polybutadiene with methacrylic acid and curing the mixture with a peroxide.

Nevertheless, the products disclosed in these patent references have a tensile strength lower than 300 kg/$cm^2$, and moreover, a reference to an ethylenically unsaturated nitrile/conjugated diene type highly saturated rubber cannot be found in any of these patent references.

SUMMARY OF THE INVENTION

The primary abject of the present invention is to provide a curable rubber composition comprising an ethylenically unsaturated nitrile/conjugated diene type rubber, which results in a cured product having not only a high tensile strength but also an improved abrasion resistance and compression set resistance.

In accordance with the present invention, there is provided a curable rubber composition comprising (a) 100 parts by weight of an ethylenically unsaturated nitrile/conjugated diene type highly saturated rubber in which the content of conjugated diene units in the polymer chain is not higher than 30% by weight, (b) 10 to 100 parts by weight of a zinc salt of methacrylic acid , (c) 5 to 50 parts by weight of silicic anhydride and (d) 0.2 to 10 parts by weight of an organic peroxide.

DESCRIPTION OF THE PREFERRED EMBODIMENTS

Figure 1:
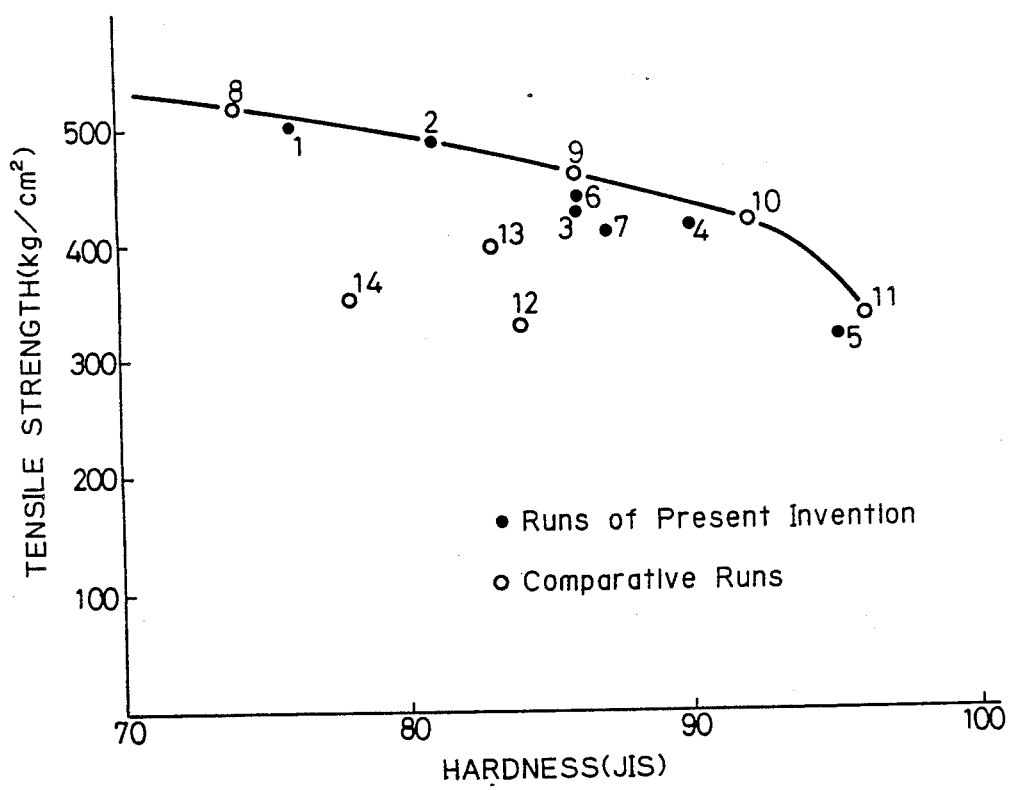
FIG. 1 illustrates the relationship between the hardness and the tensile strength.

As the ethylenically unsaturated nitrile/conjugated diene type highly saturated rubber used in the present invention, there can be mentioned a copolymer comprising (a) 10 to 60% by weight of units derived from an ethylenically unsaturated nitrile such as acrylonitrile or methacrylonitrile and (b) 40 to 90% by weight of units derived from a conjugated diene such as 1,3-butadiene, isoprene or 1,3-pentadiene, and a multi-monomer copolymer comprising units derived from the above-mentioned ethylenically unsaturated nitrile and conjugated diene, and (c) units derived from a monomer copolymerizable therewith, such as a vinyl aromatic compound, methacrylic acid, acrylic acid, an alkyl methacrylate having 1 to 18 carbon atoms in the alkyl group, an alkyl acrylate having 1 to 18 carbon atoms in the alkyl group, an alkoxyalkyl methacrylate having 2 to 12 carbon atoms in the alkoxyalkyl group, an alkoxyalkyl acrylate having 2 to 12 carbon atoms in the alkoxyalkyl group, a cyanoalkyl methacrylate having 2 to 12 carbon atoms in the cyanoalkyl group, or a cyanoalkyl acrylate having 2 to 12 carbon atoms in the cyanoalkyl group. As specific examples, there can be mentioned an acrylonitrile/butadiene copolymer rubber, an acrylonitrile/isoprene copolymer rubber, an acrylonitrile/butadiene/isoprene copolymer rubber, an acrylonitrile/butadiene/acrylate copolymer rubber, and an acrylonitrile/butadiene/acrylate/methacrylic acid copolymer rubber. In these rubbers, the content of conjugated diene units is rendered not larger than 30% by weight by means such as partial hydrogenation.

The zinc salt of methacrylic acid used in the present invention is prepared by reacting a zinc compound such as zinc oxide or zinc carbonate with methacrylic acid at a molar ratio of from 0.5/1 to 3/1, preferably from 0.5/1 to 2/1. The prepared metal salt can be used for the preparation of the curable composition of the present invention, or a method can be adopted in which a zinc compound and methacrylic acid are added to the rubber when preparing the composition of the present invention and zinc methacrylate is formed in the composition. Preferably, the zinc compound or zinc methacrylate is one from which coarse particles have been removed, i.e., one from which coarse particles having a particle diameter of at least 20 μm have been removed; for example, by air classification. The zinc methacrylate is used in an amount of 10 to 100 parts by weight, preferably 10 to 80 parts by weight, per 100 parts by weight of the rubber.

The silicic anhydride, which is a characteristic component effective for improving the abrasion resistance and compression set resistance, is preferably in the form of particles not containing coarse particles having a particle diameter of at least 20 μm as particles of the zinc compound or zinc methacrylate. If the particle diameter is large, the tensile strength is drastically reduced. The silicic anhydride is used in an amount of 5 to 50 parts by weight, preferably 5 to 40 parts by weight, per 100 parts by weight of the rubber.

Any organic peroxide customarily used for the peroxide curing of rubbers can be used in the present invention, without limitation. For example, there can be mentioned dicumyl peroxide, di-t-butyl peroxide, t-butylcumyl peroxide, benzoyl peroxide, 2,5-dimethyl-2,5-di(t-butylperoxy)hexyne-3, 2,5-dimethyl-2,5di(benzoylperoxy)hexane, 2,5-dimethyl-2 5-mono(t-butylperoxy)- hexane and α,α'-bis(t-butylperoxy-m-isopropyl)benzene. These organic peroxides can be used alone or as a mixture of two or more thereof. In general, the organic peroxide is used in an amount of 0.2 to 10 parts by weight per 100 parts by weight of the rubber. An optimum amount is appropriately determined according to the required values of the physical properties.

The curable rubber composition of the present invention can be prepared by any method, as long as a good dispersion state of the zinc methacrylate is obtained. In general, the curable rubber composition is prepared by mixing the components by a roll, Banbury mixer or kneader customarily used in the rubber industry. When the zinc methacrylate is produced in the composition, preferably a method is adopted in which zinc oxide is uniformly mixed in the composition in advance by a kneader, as mentioned above, and then methacrylic acid is incorporated or absorbed In the curable rubber composition of the present invention, various chemicals customarily used in the rubber industry, for example, a reinforcer such as carbon black, a filler such as calcium carbonate or talc, a crosslinking assistant such as triallyl isocyanurate, trimethylolpropane triacrylate or m-phenylene bismaleimide, a plasticizer, a stabilizer, a processing aid, and a colorant, can be incorporated in combination with the above-mentioned components according to the intended object.

The curable rubber composition of the present invention provides a cured product having an excellent strength, abrasion resistance, and compression set resistance. Therefore, the curable rubber composition of the present invention can be valuably applied where these characteristics are required, for example, for rolls, belts, snow chains, tires, and caterpillars.

The present invention will now be described in detail with reference to the following examples. In the examples and comparative examples, all of "parts" and "%" are by weight, unless otherwise indicated

EXAMPLE 1

A curable rubber composition was prepared according to a recipe shown in Table 1. A cured sheet having a thickness of 2 mm was prepared by press-curing under the curing conditions shown in Table 1. The physical properties of the cured product were measured according to JIS K-6301, and the results are shown in Table 1.

Figure 2:
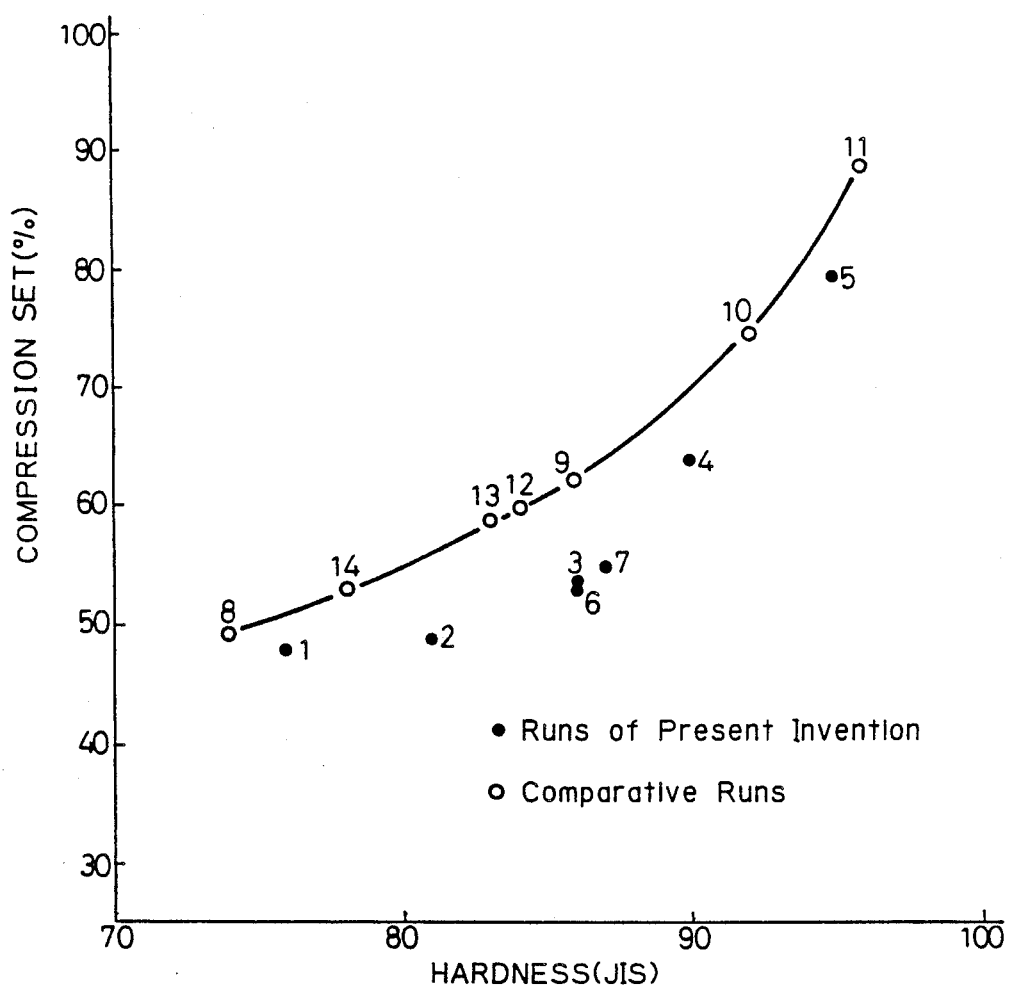
FIG. 2 illustrates the relationship between the hardness and the compression set.
Figure 3:
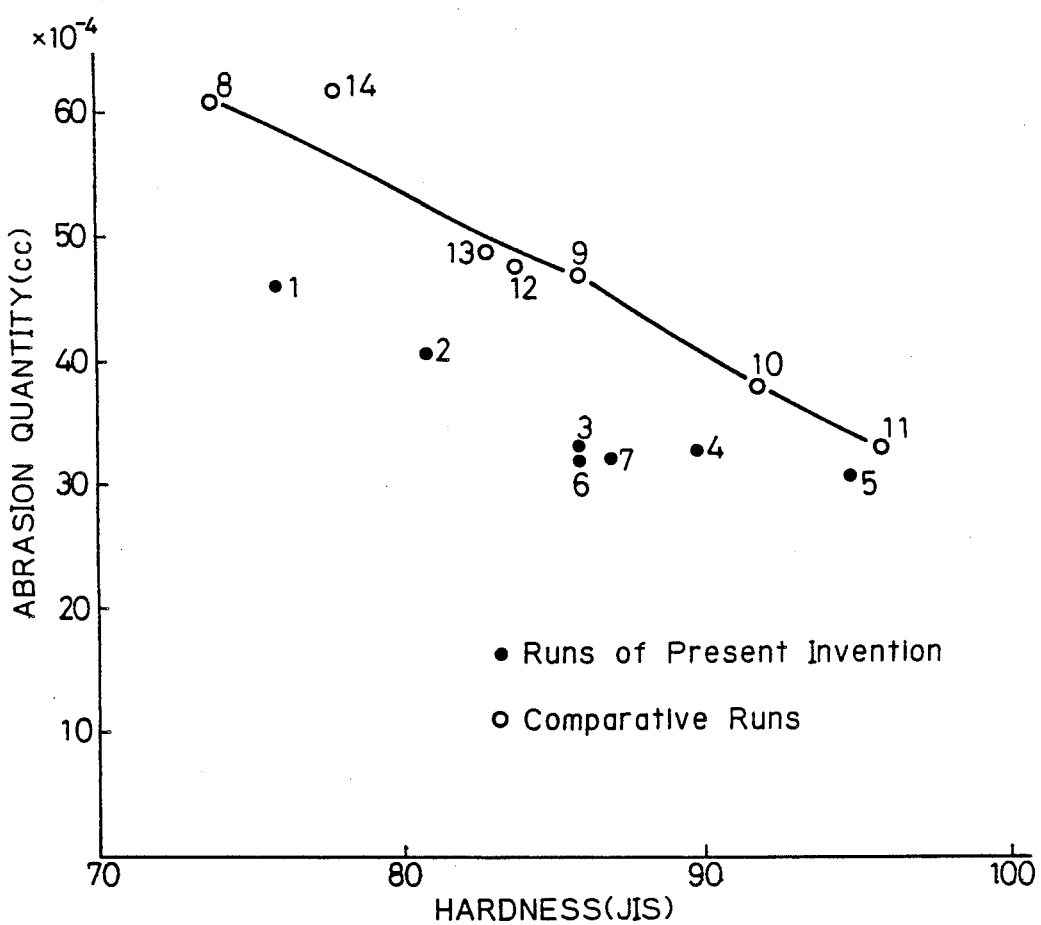
FIG. 3 illustrates the relationship between the hardness and the abrasion quantity

The physical properties of a rubber depend greatly on the hardness, and accordingly, the values of the physical properties were plotted, relative to the hardness, as the abscissa FIG. 1 shows the relationship between the hardness and the tensile strength, FIG. 2 shows the relationship between the hardness and the permanent compression set, and FIG. 3 shows the relationship between the hardness and the abrasion quantity. In the drawings, each numerical figure indicates the run number.

As apparent from FIG. 1, the composition of the present invention has a high tensile strength comparable to that of the comparative composition (runs 8 through 11) formed by incorporating only zinc methacrylate into the rubber, and as apparent from FIGS. 2 and 3, each value of the present invention is smaller than the corresponding value of the comparison at the same hardness, and the composition of the present invention is obviously superior.

TABLE 1

|   |   | Runs of present invention | | | | | | | Comparative Runs | | | | | | |
|---|---|---|---|---|---|---|---|---|---|---|---|---|---|---|---|
|   |   | 1 | 2 | 3 | 4 | 5 | 6 | 7 | 8 | 9 | 10 | 11 | 12 | 13 | 14 |
| Recipe | Hydrogenated NBR*1 | 100 | 100 | 100 | 100 | 100 | 100 | 100 | 100 | 100 | 100 | 100 | 100 | 100 | 100 |
|  | Zinc methacrylate*2 | 30 | 30 | 30 | 45 | 60 | — | — | 30 | 45 | 60 | 80 | 30 | 30 | 30 |
|  | Zinc oxide*3 | — | — | — | — | — | 15 | 20 | — | — | — | — | — | — | — |
|  | Methacrylic acid | — | — | — | — | — | 20 | 20 | — | — | — | — | — | — | — |
|  | Aerosil 200*4 | 5 | 10 | 20 | 10 | 10 | 20 | 20 | — | — | — | — | — | — | — |
|  | Silton R-2*5 | — | — | — | — | — | — | — | — | — | — | — | 20 | — | — |
|  | Carbon black | — | — | — | — | — | — | — | — | — | — | — | — | 20 | — |
|  | Clay*6 | — | — | — | — | — | — | — | — | — | — | — | — | — | 20 |
|  | Peroxide*7 | 5 | 5 | 5 | 5 | 5 | 5 | 5 | 5 | 5 | 5 | 5 | 5 | 5 | 5 |
| Curing conditions | Temperature (°C.) | 180 | 180 | 180 | 180 | 180 | 180 | 180 | 180 | 180 | 180 | 180 | 180 | 180 | 180 |
|  | Time (min) | 10 | 10 | 10 | 10 | 10 | 10 | 10 | 10 | 10 | 10 | 10 | 10 | 10 | 10 |
| Physical properties of cured product*8 | Tensile strength (kg/cm$^2$) | 505 | 493 | 433 | 421 | 323 | 442 | 415 | 520 | 465 | 424 | 339 | 332 | 400 | 356 |
|  | Elongation | 440 | 430 | 400 | 360 | 210 | 400 | 390 | 460 | 380 | 310 | 170 | 380 | 390 | 361 |
|  | Hardness | 76 | 81 | 86 | 90 | 95 | 86 | 87 | 74 | 86 | 92 | 96 | 84 | 83 | 78 |
|  | Abrasion quantity*9 (cc × 10$^{-4}$) | 46 | 41 | 33 | 33 | 31 | 32 | 32 | 61 | 47 | 38 | 33 | 48 | 49 | 62 |
|  | Compression set (%) | 48 | 49 | 54 | 64 | 80 | 53 | 55 | 49 | 62 | 75 | 89 | 60 | 59 | 53 |

Note
*1 Zetpole 2020 supplied by Nippon Geon, acrylonitrile content = 37%, hydrogenation ratio = 90%
*2 product supplied by Asade Kagaku, particles from which coarse particles having a diameter larger than 20 μm had been removed by air classification
*3 zinc oxide No. 1 supplied by Seido Kagaku
*4 silicic anhydride supplied by Nippon Aerosil
*5 hydrous silicic acid supplied by Mizusawa Kagaku
*6 Dixie clay supplied by R.T. vanderbilt
*7 α, α'-bis(tert-butylperoxy-m-isopropyl)benzene having a purity of 40%
*8 JIS K-6301
*9 JIS D-2228, pico abrasion tester

We claim:

1. A curable rubber composition comprising (a) 100 parts by weight of an ethylenically unsaturated nitrile/conjugated diene type highly saturated rubber in which the content of conjugated diene units in the polymer chain is not higher than 30% by weight, (b) 10 to 100 parts by weight of a zinc salt of methacrylic acid, (c) 5 to 50 parts by weight of silicic anhydride and (d) 0.2 to 10 parts by weight of an organic peroxide.

2. A curable rubber composition according to claim 1, wherein said ethylenically unsaturated nitrile/conjugated diene type highly saturated rubber is a hydrogenation product of a copolymer comprising (a) 10 to 60%, by weight of units derived from an ethylenically unsaturated nitrile, (b) 40 to 90% by weight of units derived from a conjugated diene, and (c) the balance of units derived from an optional ethylenically unsaturated monomer copolymerizable with the nitrile (a) and the diene (b).

3. A curable rubber composition according to claim 2, wherein the ethylenically unsaturated nitrile is acrylonitrile or methacrylonitrile.

4. A curable rubber composition according to claim 2, wherein the conjugated diene is 1,3-butadiene, isoprene or 1,3-pentadiene.

5. A curable rubber composition according to claim 2, wherein the copolymerizable ethylenically unsaturated monomer is selected from the group consisting of vinyl aromatic compounds, methacrylic acid, acrylic acid, alkyl methacrylates, the alkyl group of which has 1 to 18 carbon atoms, alkyl acrylates the alkyl group of which has 1 to 18 carbon atoms, alkoxyalkyl methacrylates, the alkoxyalkyl group of which has 2 to 12 carbon atoms, alkoxyalkyl acrylates, the alkoxyalkyl group having 2 to 12 carbon atoms, cyanoalkyl methacrylates, the cyanoalkyl group of which has 2 to 12 carbon atoms, and cyanoalkyl acrylates, the cyanoalkyl group of which has 2 to 12 carbon atoms.

6. A curable rubber composition according to claim 1, wherein said zinc salt of methacrylic acid is in the form of particles but does not contain coarse particles having a diameter of 20 $\mu$m or larger.

7. A curable rubber composition according to claim 1, wherein the amount of the zinc salt of methacrylic acid is 10 to 80 parts by weight per 100 parts by weight of the highly saturated rubber.

8. A curable rubber composition according to claim 1, wherein the silicic anhydride is in the form of particles but does not contain coarse particles having a diameter of 20 $\mu$m or larger.

9. A curable rubber according to claim 1, wherein the amount of the silicic anhydride is 5 to 40 parts by weight per 100 parts by weight of the highly saturated rubber.

* * * * *